Sept. 6, 1966 K. E. WOOD 3,271,082
BLOWER CONVEYOR
Filed Dec. 3, 1964 3 Sheets-Sheet 1

INVENTOR.
K. E. WOOD
BY John M Nolan
ATTORNEY

Sept. 6, 1966  K. E. WOOD  3,271,082
BLOWER CONVEYOR
Filed Dec. 3, 1964  3 Sheets-Sheet 3
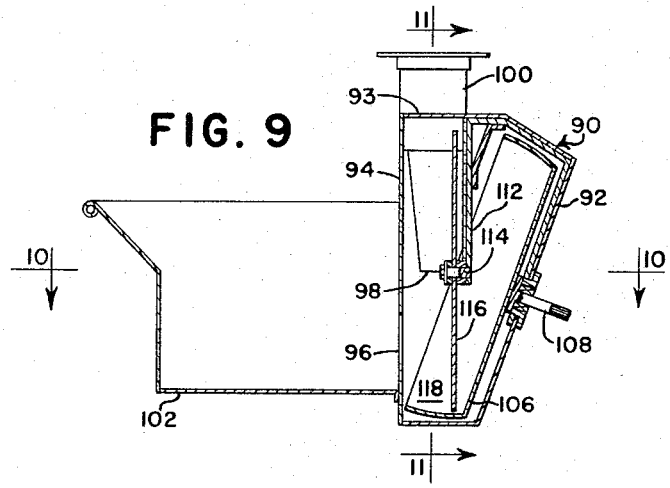
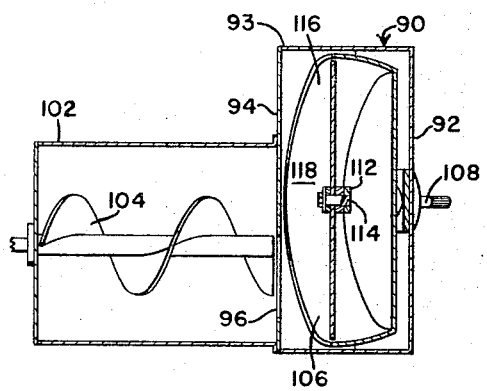
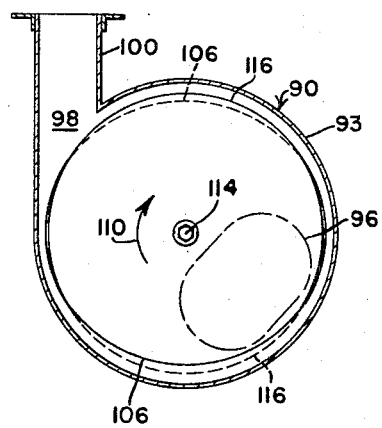
INVENTOR.
K. E. WOOD
BY John M Nolan
ATTORNEY United States Patent Office 3,271,082
Patented Sept. 6, 1966

3,271,082
BLOWER CONVEYOR
Keith E. Wood, Ottumwa, Iowa, assignor to Deere & Company, Moline, Ill., a corporation of Delaware
Filed Dec. 3, 1964, Ser. No. 415,749
13 Claims. (Cl. 302—37)

This invention relates to a blower conveyor or elevator and more particularly to a blower elevator having an improved impeller for more efficiently delivering material such as chopped hay or ensilage in to storage facilities.

Elevators of this type conventionally include a hopper and means for feeding material from the hopper generally axially into one side of a radially-vaned blower rotor that rotates within a closed cylindrical coaxial housing having a tangential outlet through which the material is discharged.

Such blowers are, however, inefficient users of power, mainly because of power loss caused by frictional drag between the moving material and the stationary housing. The normal frictional drag between moving material and a stationary surface is also magnified at the circumferential surface because centrifugal force crowds the material against the circumferential surface.

The principal object of the present invention is to provide means for eliminating or reducing this fractional drag between the material and the housing.

To accomplish this object, the invention provides different impeller configurations wherein a portion of the impeller is interposed between the material and the circumeferential surface of the housing. Accordingly, another object of the invention is to provide a blower having an impeller member interposed between the housing and the moving material.

A more specific object is to provide a blower impeller having rotating radial blower vanes and a drum-like impeller member with radial apertures rotating between the vanes and the housing in a timed relationship with the vanes.

Another object is to provide a hollow conically-shaped impeller member, the material being introduced into the interior of the conical impeller member from which it is discharged after attaining the required velocity.

Another object is to provide an impeller in the shape of a hollow truncated hemisphere, the material being introduced into the interior of the hemisphere from which it is discharged through the blower outlet after receiving the necessary impetus. Another object is to provide means for moving the material from the inner periphery of such a truncated hemispherical impeller for discharge through the blower outlet.

Still another object is to provide such blower impellers of simple and rugged construction, capable of high-speed rotation and inexpensive to manufacture.

These and other objects will become apparent from the following detailed description and accompanying drawings in which:

FIGS. 3, 4, and 5 together schematically show the timed relationship between the impeller vanes, impeller member, and blower outlet.

FIG. 9 is a vertical sectional view taken along the impeller axis showing a third embodiment of the invention.

FIG. 10 is a sectional plan view of the embodiment shown in FIG. 9 taken along the line 10—10 of FIG. 9.

FIG. 11 is a sectional view taken along the line 11—11 of FIG. 9.

Figure 1:
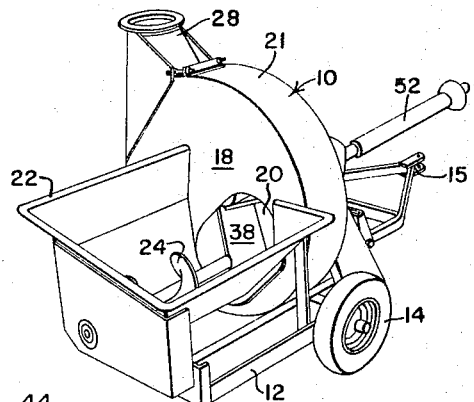
FIG. 1 is a perspective view of a blower type elevator including one embodiment of the invention.
Figure 2:
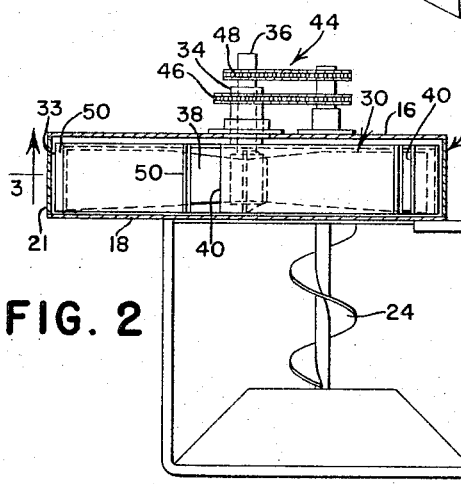
FIG. 2 is a top plan view of the elevator shown in FIG. 1 with a portion of the blower housing removed to more clearly show the impeller.

Referring now to FIGS. 1, 2, 3, 4 and 5, there is shown a blower type elevator having a substantially cylindrical blower housing 10 supported on a frame structure 12 which also carries a pair of wheels 14. The blower may be towed by a tractor or other vehicle through a draft tongue 15 attached to the frame structure 12.

The blower housing 10 is axially horizontal and includes a radial closed end wall 16, a radial inlet end wall 18 which is also closed except for an inlet opening 20 and a peripheral or circumferential wall 21. A hopper 22 is supported by the frame 12 and the housing 10 adjacent the inlet end 18 and includes an auger 24 journaled for rotation in the bottom of the hopper for feeding material from the hopper through the inlet opening 20 to the interior of the housing 10.

The circumferential wall 21 of the housing 10 has an outlet opening 26 communicating with a discharge spout 28 which extends tangentially upwardly from the housing for discharge of the propelled material from within the housing.

An impeller, indicated generally by the numeral 30, is coaxially journaled within the housing 10 and includes a hollow, cup-shaped cylindrical impeller member 32 having its open side toward the inlet end 18 of the housing 10 and having its peripheral wall 33 of a slightly smaller diameter than the housing wall 21. The impeller member is mounted on a coaxial hollow shaft 34 which is journaled within the housing. The impeller also includes an impeller vane shaft 36 which is coaxially journaled within the impeller member shaft 34 and which carries a plurality of radial vanes 38 equally spaced circumferentially within the impeller member 32 and extending to the inner periphery of the impeller member.

A plurality of axially extending apertures 40, here of rectangular shape, are equally spaced around the circumferential wall 33 of the impeller member 32 and number one more than the number of vanes 38. Thus, when the impeller has four vanes 38, as shown in the drawings, there are five apertures 40.

The impeller member 32 and the vanes 38 are rotated in the direction of the arrow 42 by drive means 44, which has separate drive elements 46 and 48 for rotating the shafts 34 and 36 respectively at different speeds. The speeds of the impeller member and the vanes are timed so that the impeller member 32 will make the same number of revolutions as there are impeller vanes 38, in the same period of time that the impeller vanes make the same number of revolutions as there are apertures 40 in the impeller member. Thus, in the embodiment shown in the drawings, the impeller vanes 38 will make five revolutions in the same time that the impeller member makes four revolutions.

In addition, the impeller vanes 38 are so positioned and the circumferential width of the apertures 40 is such that the impeller vanes move past an operature only when aperture is opposite the outlet opening 26. Thus, the impeller vanes 38 discharge the material through the aperture only when the material can move through the outlet opening.

The wall 33 of the impeller member 32 also has a radial lip 50 extending from its outer periphery adjacent the trailing side of each aperture 40 relative to the direction of rotation, the outer edge of said lip moving closely adjacent to the inner periphery of the housing 10 to prevent the buildup of material between the impeller member 32 and the housing 10.

The drive means 44 is conventionally powered by a tractor powered takeoff mechanism (not shown) through a power shaft 52.

Figure 3:
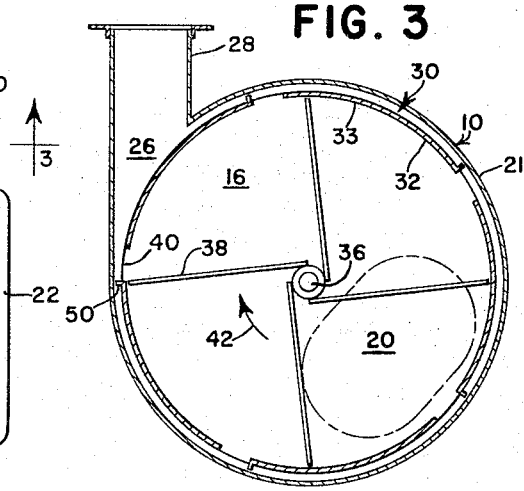
FIG. 3 is a vertical sectional view of the blower taken along lines 3—3 of FIG. 2, with the shaft and the impeller vanes shown in full, the inlet being shown in dotted lines for reference purposes.
Figure 4:
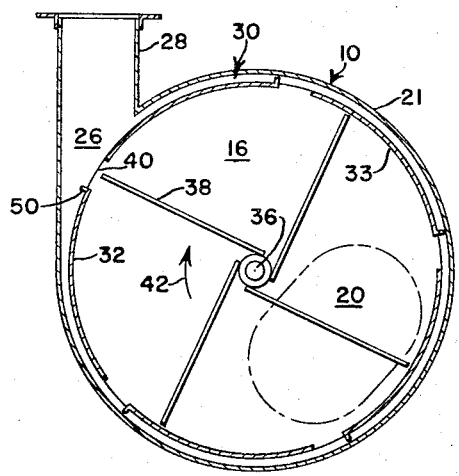
FIGS. 4 and 5 are similar views to FIG. 3, but showing the impeller vanes and impeller member at different stages in their rotation.
Figure 5:
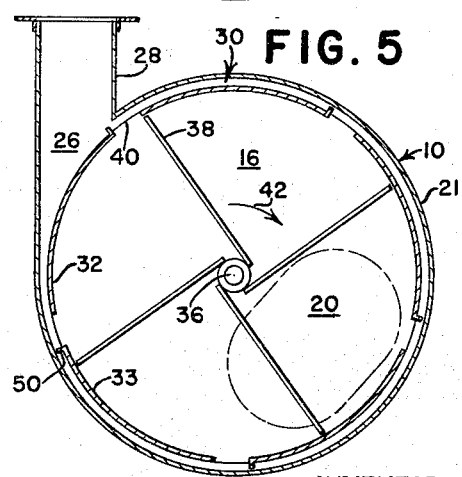

In operation, the material to be elevated is moved by the auger 24 from the hopper 22 into the blower housing 10 through the inlet opening 20, which is located on FIGS. 3, 4 and 5 by the dotted lines. Upon entering the blower housing 10, the material is received within and rotated by the rotating impeller member 32 and impeller vanes 38. Since the moving impeller member 32 is interposed between the moving material and the stationary housing 10 except at the inlet end wall 18 of the housing, there is very little friction between the material and the housing. When the material is moved to a position adjacent to the outlet 26, the impeller vane 38 which is moving that particular portion of material, is advanced relative to the impeller member 32 to a position adjacent the trailing edge of an aperture 40 as shown in FIG. 3 (vane 38 at "nine o'clock"). Since there is nothing to impede the radial movement of material at this point, the centrifugal force created by the angular velocity of the material moves the material through the aperture, whereupon the angular momentum carries it tangentially through the discharge spout 28. Additional discharge tubes are generally added to the discharge spout to direct the movement of the material after it leaves the discharge spout.

When impeller member 32 advances to the position shown in FIG. 4, wherein the aperture 40 (at "ten o'clock") is opposite the middle of the outlet opening 26, the vane 38 which is rotating slightly faster than the impeller member is at about the middle of the aperture 40. When the aperture 40 advances to a position opposite the advanced edge of the outlet opening 26, as shown in FIG. 5, the vane 38 moves to the leading edge of the aperture. At this point, any material remaining on the leading side of the vane 38 can no longer move through the aperture and will be retained within the impeller member until it can be moved through the next preceding aperture 40. The relative speeds of the vanes 38 and the impeller member 32 are such that the vane will catch up to said next preceding aperture 40 when the aperture reaches the outlet opening 26 as in FIG. 3.

Figure 6:
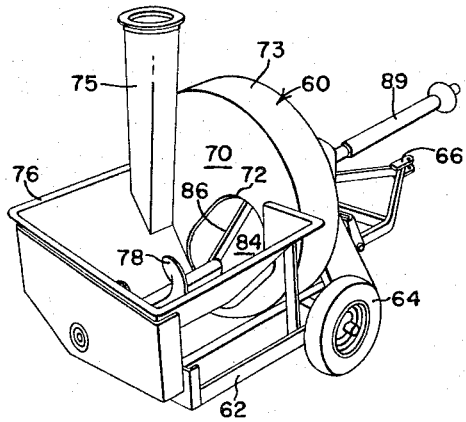
FIG. 6 is a perspective view of a blower type elevator including a second embodiment of the invention.
Figure 7:
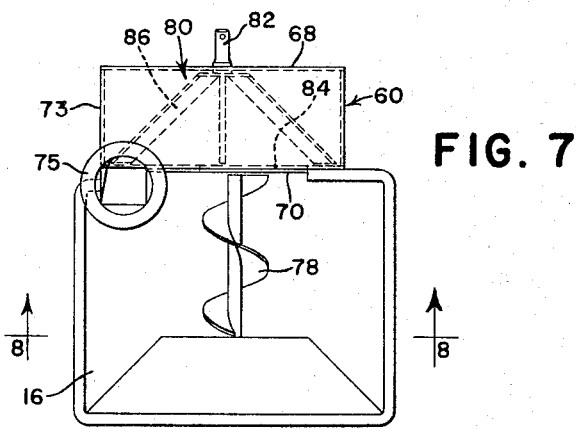
FIG. 7 is a plan view of the embodiment shown in FIG. 6.
Figure 8:
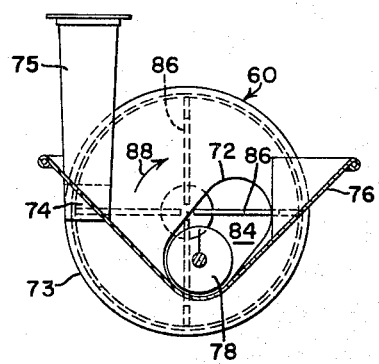
FIG. 8 is a sectional view taken along the line 8—8 of FIG. 7.

FIGS. 6, 7 and 8 show a different embodiment of the invention, the blower type elevator having a cylindrical housing 60 supported on a frame 62 having wheels 64 and a draft tongue 66.

The blower housing 60 is axially horizontal and has a radial closed end wall 68, a radial inlet end wall 70 which is also closed except for an inlet opening 72 and a peripheral wall 73 leading to outlet opening 74 adjacent to the outer periphery of the inlet end, for upward, tangential discharge of the material through an upwardly extending discharge spout 75.

A hopper 76 includes an auger 78 for feeding material from the hopper through the inlet opening 72 to the interior of the housing 60. An impeller, indicated generally by the numeral 80, includes a shaft 82 coaxially journaled in the housing 60 and coaxially carrying a hollow, truncated cone-shaped impeller member 84 for rotation within the housing, the larger end of the impeller member facing the inlet end 70 of the housing. A plurality of flat impeller vanes 86 project radially from the inner periphery of the impeller member and extend longitudinally between the opposite ends of the impeller member. The impeller is rotated in the direction of the arrow 88 by drive means powered by a power shaft 89.

In operation, the material to be elevated is moved by the auger 78 from the hopper 76 through the inlet opening 72 into the interior of the impeller member 84. When the material contacts the rotating impeller 80, it receives an angular velocity in the direction of impeller rotation. Since the moving material is carried within the rotating impeller member 84, the sole source of frictional drag between the moving material and the stationary housing 60 is at the inlet end 70 of the housing.

The rotating material tends to seek the largest diameter of the impeller member 84 because of centrifugal force and accordingly, moves within the impeller member toward the inlet end of the housing. When the material reaches the outlet opening 74, the centrifugal force moves it through the outlet opening, whereupon the angular momentum carries it tangentially through the discharge spout 75.

A slightly different embodiment of the invention is shown in FIGS. 9, 10 and 11. The blower type elevator again includes an approximately cylindrical axially horizontal housing 90, having an inclined radial closed end wall 92, a vertical radial inlet end wall 94 which is also closed except for an inlet opening 96 and a circumferential wall 93 having an outlet opening 98 on one side communicating with an upwardly extending tangential discharge spout 100.

A hopper 102 includes an auger 104 for moving material through the inlet opening 96. A hollow impeller member 106 in the shape of a truncated hemisphere having its large end open and facing the inlet end 94 of the housing is coaxially carried by an impeller shaft 108 which is journaled in the housing on an axis slightly inclined from the horizontal axis of the housing. The impeller member 106 is rotated in the direction of the arrow 110 by conventional drive means (not shown).

A support member 112 depends from the interior of the housing 90 and carries a horizontal pivot 114 at its lower end coaxial to the housing axis and in the same vertical plane as the axis of the shaft 108. A flat circular disk 116, having substantially the same radius as the interior of the impeller member 106, is mounted for rotation about the pivot 114, the center of the disk substantially coinciding with the center of the impeller member.

In operation, the material to be elevated is fed from the hopper 102 by the auger 104 through the inlet opening 96 into the lower interior portion of the impeller member 106. Since the axis of the impeller member is inclined downwardly away from the axis of the disk 116, the lower half of the disk is positioned within the impeller member interior below the horizontal centerline of the impeller member, the disk and impeller member forming a spherical wedge-shaped cavity. The material is deposited in the lower, wider part of the cavity, where it receives an angular velocity in the same direction as the rotation of the impeller member. The disk 116 is preferably rotated by frictional contact with the material and the impeller member at substantially the same speed as the impeller member, although a positive drive for the disk could also be provided.

Since the moving impeller member 106 and disk 116 are substantially interposed between the housing and the moving material except for the inlet end of the housing, frictional drag between the housing and the material is reduced.

As the material rotates, it is moved toward the open end of the impeller member by the disk 116 until it is moved completely out of the impeller member interior at the horizontal centerline of the disk and the open end of the impeller member. Since the outlet opening 98 is adjacent the point where the material is moved out of the impeller member, the angular momentum of the material carries it tangentially through the outlet opening and through the discharge spout 100.

While in the foregoing description certain words such as "horizontal," "vertical," "upwardly" and "downwardly" are used to describe the relative positions of the components, it is to be understood that such words are merely words of convenience to more clearly describe the invention and are not to be construed as limiting the orientation or position of the components or the machine.

Other features and advantages of the present invention will readily occur to those skilled in the art, as will many modifications and alterations in the preferred embodiments of the invention described herein, all of which may be achieved without departing from the spirit and the scope of the invention.

What is claimed is:

1. In a blower having a generally cylindrical housing including axially spaced apart end walls and a peripheral wall and to which material is fed through an inlet in one of the end walls for tangential discharge through an outlet in the peripheral wall, the improvement comprising impeller means coaxially journaled within the housing and including cup-shaped structure facing toward the inlet to receive material therefrom, said structure including circumferentially directed means rotatable past the outlet and operative to confine material within the impeller means and out of frictional contact with the peripheral wall, and said structure being so related to the outlet as to effect release of the confined material to and for discharge through said outlet during rotation of the impeller means.

2. In a blower conveyor having a housing, an impeller rotating within the housing and including a plurality of radial impeller vanes, one end of the housing transverse to the impeller axis having an inlet for feeding material to the impeller, the housing also having an outlet for delivery of the propelled material, the improvement comprising an impeller member interposed between the vans and the housing, open toward the housing inlet and having a plurality of radial apertures, the impeller member coaxially rotating in a timed relationship with the impeller vanes for discharge of the material through the apertures and the housing outlet.

3. The invention defined in claim 2 wherein the impeller member is in the shape of a cylinder rotating about the cylinder axis.

4. The invention defined in claim 3 wherein the rotations of the impeller member and the impeller vanes are timed so that the impeller vanes move past the impeller member apertures only when the apertures are opposite the housing outlet.

5. The invention defined in claim 4 wherein the impeller vanes are equally spaced circumferentially and the impeller member apertures are also equally spaced around the impeller member circumference and number one more than the impeller vanes.

6. The invention defined in claim 5 wherein the rotations of the impeller member and the impeller vanes are timed so that the impeller vanes make the same number of revolutions as the number of apertures in the impeller member in the same time that the impeller members make the same number of revolutions as there is vanes.

7. A blower conveyor comprising a closed housing, an impeller rotatable within the housing, means for rotating the impeller, one end of the housing transverse to the impeller axis having an opening for feeding the material to the impeller, the housing also having a tangential outlet for delivering the propelled material, the impeller including an impeller member interposed between the housing and the material, open toward the housing inlet, the material being tangentially discharged through the outlet upon receiving an angular velocity.

8. A blower conveyor comprising a closed housing, an impeller rotatable within the housing and including a plurality of radial vanes, means for rotating the impeller, one end of the housing transverse to the impeller axis having an opening for feeding the material to the impeller, the housing also having a tangential outlet for delivering the propelled material, the impeller also including an impeller member interposed between the housing and the material, open toward the housing inlet and having a plurality of radial apertures, the impeller member coaxially rotating with the impeller vanes in a timed relationship for discharge of the material through the aperture and the housing outlet.

9. The invention defined in claim 8 wherein the housing is cylindrical in shape and closed at both ends, and the impeller member is also cylindrical and coaxially rotates about the housing axis.

10. A blower conveyor comprising a closed housing, a hollow truncated cone-shaped impeller member journaled for rotation about the axis of the cone within the housing, means for rotating the impeller member, a plurality of impeller vanes carried by and projecting from the impeller interior in a generally radial direction, the housing having one end parallel to and adjacent the large end of the impeller member, an opening in said end communicating with the interior of said impeller member for movement of material thereto, an outlet opening in said end adjacent a portion of the inner periphery of the large end of the impeller member for discharge of the propelled material, and a discharge spout communicating with said outlet opening and extending from the outlet in an advance tangential direction relative to the impeller rotation.

11. The invention defined in claim 10 and further characterized by a hopper located adjacent the inlet opening on the housing exterior and conveyor means on the bottom of said hopper for feeding material through said inlet opening.

12. A blower conveyor comprising a substantially closed housing, an impeller member having a truncated hemispherically shaped recess, with its larger end open and journaled for rotation within the housing about the axis of the recess, means for rotating the impeller member, a circular disk having substantially the same radius as said recess and journaled for rotation within the housing, and partially within the recess, the rotation being about its axis which angularly intersects the impeller member axis, the impeller member and the intersecting disk and open end of the recess forming a spherical wedge-shaped impeller cavity, the housing forming an inlet adjacent the open side of said impeller cavity for movement of material into said cavity where it receives an angular velocity, the housing also forming an outlet opening adjacent the rotationally advanced end of the spherical wedge-shaped impeller cavity, for tangential discharge of the material.

13. A blower conveyor comprising a substantially closed housing, a drum-like impeller member having a truncated hemispherically-shaped interior open toward the large end and journaled for rotation about its axis within the housing, means for rotating the impeller member, a circular disk having substantially the same radius as the interior of the impeller member and journaled for rotation within the housing about its axis which angularly intersects the impeller member axis, the center of said disk substantially coinciding with the center of the open end of the impeller member, approximately one-half of the disk lying within the impeller member interior and forming a spherical wedge-shaped impeller cavity in conjunction with the impeller member, the housing having an inlet opening adjacent the open side of the impeller cavity for movement of material through the opening into the cavity where it receives an angular velocity, the housing also forming an outlet opening adjacent the rotationally advanced end of the impeller cavity for tangential discharge of the material.

References Cited by the Examiner

UNITED STATES PATENTS

| | | | |
|---|---|---|---|
| 2,542,476 | 2/1951 | Carlson | 302—37 |
| 2,635,548 | 4/1953 | Brawley | 302—37 |
| 2,785,930 | 3/1957 | Burnside | 302—37 |
| 2,910,223 | 10/1959 | Schlumbohm. | |

ANDRES H. NIELSEN, *Primary Examiner.*